(12) United States Patent
Pinto et al.

(10) Patent No.: US 7,565,780 B2
(45) Date of Patent: Jul. 28, 2009

(54) CLIP AND CLIPPER

(75) Inventors: Robert Pinto, Hainesville, IL (US);
Eggo Haschke, Deerfield, IL (US);
Klaus Hein, Frankfurt (DE)

(73) Assignee: Poly-Clip System Corp., Mundelein, IL (US)

( * ) Notice: Subject to any disclaimer, the term of this patent is extended or adjusted under 35 U.S.C. 154(b) by 0 days.

(21) Appl. No.: 11/734,381

(22) Filed: Apr. 12, 2007

(65) Prior Publication Data

US 2007/0289252 A1    Dec. 20, 2007

Related U.S. Application Data

(63) Continuation-in-part of application No. 11/051,832, filed on Feb. 4, 2005, now abandoned, and a continuation of application No. 11/627,765, filed on Jan. 26, 2007, now abandoned.

(60) Provisional application No. 60/762,743, filed on Jan. 27, 2006, provisional application No. 60/803,756, filed on Jun. 2, 2006.

(51) Int. Cl.
*B65B 51/09*     (2006.01)
*B65D 33/26*     (2006.01)
*B23P 11/00*     (2006.01)

(52) U.S. Cl. ............... 53/138.4; 53/417; 24/30.5 R; 29/243.529

(58) Field of Classification Search ............... 24/115 A, 24/30.5 R, 30.5 W, 30.5 P, 30.5 S, 30.51, 24/30.5 L; 53/138.4, 138.3, 138.2, 417; 29/243.521, 29/243.529; 227/115, 139, 901
See application file for complete search history.

(56) References Cited

U.S. PATENT DOCUMENTS

| | | | | | |
|---|---|---|---|---|---|
| 2,709,255 | A | * | 5/1955 | Frank | ............... 72/412 |
| 2,970,359 | A | * | 2/1961 | Dryden | ............... 24/618 |
| 3,363,628 | A | * | 1/1968 | Wood | ............... 606/158 |
| 3,400,433 | A | * | 9/1968 | Klenz | ............... 24/30.5 W |
| 3,722,670 | A | * | 3/1973 | Plunkett | ............... 206/340 |
| 3,762,541 | A | * | 10/1973 | Hinden et al. | ............... 206/713 |
| 4,182,015 | A | * | 1/1980 | Niedecker | ............... 29/243.56 |

(Continued)

OTHER PUBLICATIONS

International Search Report and Written Opinion, received with regard to co-pending PCT Application No. PCT/US07/61140.

*Primary Examiner*—Paul R Durand
(74) *Attorney, Agent, or Firm*—Trexler, Bushnell, Giangiorgi, Blackston & Marr, Ltd.

(57) ABSTRACT

An article for packaging an item is described. The article comprises packaging material gathered into a neck and a clip fastening the neck, the clip comprising a top section and two legs connected by the top section, the top section comprising an internal face and an external face, the two legs being folded inward to contact each other, the folded legs and the top section defining a space securing the neck, and the clip further comprising at least one of a shoulder extending from the external face and a pin extending from the internal face into the space. In another embodiment, the invention comprises a plurality of these clips connected by extensions. In another embodiment, the invention further comprises a clipper for using the clips, the clipper having at least one of a notch in the rail of the clipper, a notch in the guide rail of the clipper, and a protrusion in the guide rail of a clipper.

4 Claims, 10 Drawing Sheets

U.S. PATENT DOCUMENTS

| | | | |
|---|---|---|---|
| 4,189,062 A * | 2/1980 | Jackson | 221/188 |
| 4,502,186 A * | 3/1985 | Clarke et al. | 24/16 PB |
| 4,506,415 A * | 3/1985 | Swift | 24/16 PB |
| 4,509,231 A * | 4/1985 | Paxton | 24/30.5 R |
| 4,581,481 A * | 4/1986 | Moretti | 174/135 |
| 4,648,531 A * | 3/1987 | Won | 221/232 |
| 4,881,301 A * | 11/1989 | Sweeney et al. | 24/30.5 R |
| 5,109,576 A * | 5/1992 | Teekell et al. | 24/30.5 R |
| 5,366,479 A * | 11/1994 | McGarry et al. | 606/219 |
| 5,497,645 A | 3/1996 | Niedecker | |
| 5,586,424 A * | 12/1996 | Chen et al. | 53/138.2 |
| 5,852,850 A * | 12/1998 | Hanten et al. | 24/20 R |
| 5,953,794 A | 9/1999 | Hanten et al. | |
| 6,056,705 A * | 5/2000 | Stigar-Brown | 601/84 |
| 6,058,572 A | 5/2000 | Folkmar | |
| 6,101,785 A * | 8/2000 | Bienert et al. | 53/138.4 |
| 6,401,306 B1 | 6/2002 | Hanten et al. | |
| 6,408,489 B1 | 6/2002 | Cluggish | |
| 6,591,460 B1 | 7/2003 | Hoshino | |
| 6,675,554 B1 * | 1/2004 | Hanten et al. | 53/138.4 |
| 2006/0042051 A1 * | 3/2006 | Irwin | 24/30.5 S |

* cited by examiner

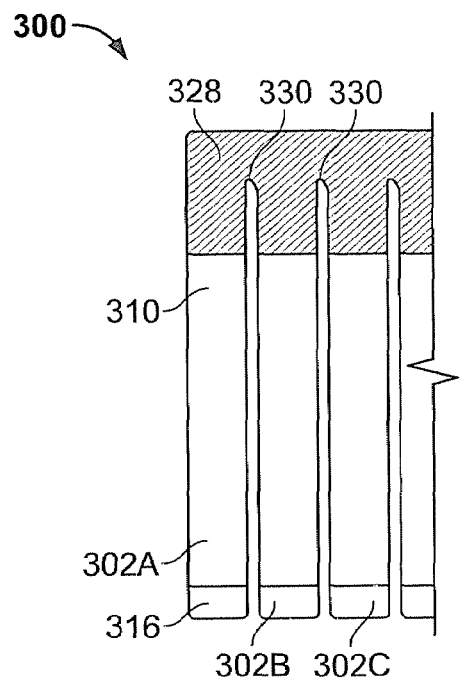
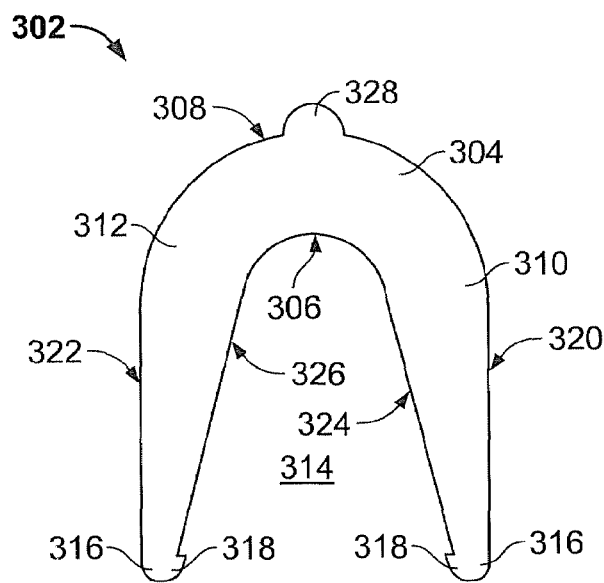
FIG. 10  FIG. 11
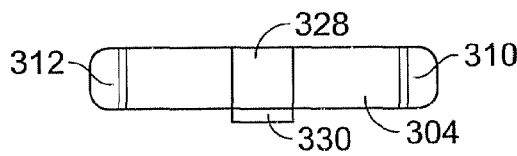
FIG. 12
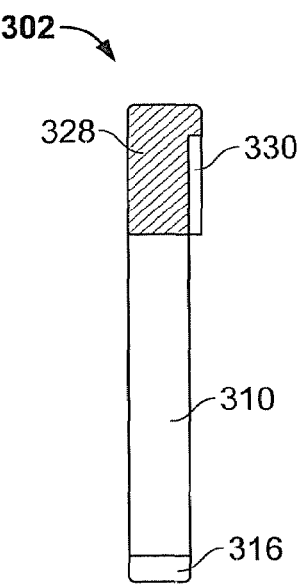
FIG. 13

CLIP AND CLIPPER

CROSS-REFERENCE TO RELATED APPLICATIONS

This application is a continuation-in-part of U.S. patent application Ser. No. 11/051,832, filed on Feb. 4, 2005, and further claims priority from U.S. patent application Ser. No. 11/627,765, filed on Jan. 26, 2007, from U.S. Provisional Patent Application No. 60/762,743, filed on Jan. 27, 2006, and from U.S. Provisional Patent Application No. 60/803,756, filed on Jun. 2, 2006, the disclosures of all of which are incorporated herein by reference.

BACKGROUND OF THE INVENTION

This invention relates to the field of enclosing material in packaging material, such as ill netting, bags, or casing. More particularly, the invention relates to the field of enclosing edible food products, such as hams, poultry, sausages, and cheeses, in packaging material, such as in netting or casing. More particularly, this invention relates to the field of enclosing material such as edible food products in packaging material such as tubular netting and closing the ends of the netting with a clip.

Various materials are commonly packaged in netting, including edible food products. Whole chickens, for example, are commonly sold enclosed in a clear plastic bag, which is sealed by a clip. Sausages are created by extruding a pasty mixture of chopped meats and spices into a tubular casing, which is sealed at either end by a clip. Some items such as fruit and potatoes are packaged in nets in order to sell the items in lots, such as by the dozen or by weight. These types of items are often placed in bag-type nets, the top of the bag is gathered, and a clip is applied to close the bag. A label may also be placed at the neck of the gathered bag to be clipped to the bag, with identifying information such as the provenance, weight, lot number, or expiration date of the items. Often this or other information is contained in a bar code on the label. Please note that these types of items are also packaged in other types of mesh-style bags or in plastic bags, which are still clipped closed as with bags made of netting.

Larger items such as hams, whole poultry, sausages, and cheeses, are packaged in netting for ease of handling and for further processing. For example, hams and turkeys are often encased in tubular netting. One end of the tube is closed with a clip, the item is placed within the netting, the netting is gathered tightly around the item, a clip is applied to enclose the item within the netting, and the netting is severed. Often, a loop is formed in the netting to create a handle on the package, to ease handling of the items, which may be heavy, and to allow consumers to lift the items without actually touching the items. As with bag-type netting, as described above, a label may be attached to one of the clips to provide identifying information.

In some situations, items are packaged in netting in order to enhance the appearance of the items after processing. For example, sausages, hams, and cheeses are often encased in tubular netting, as described above, prior to processing. During processing, such as in a smokehouse, the item expands within the netting and pushes through the mesh of the netting. After processing, the netting is removed and discarded. The item retains a dimpled appearance that is considered pleasing to consumers.

In all situations described above, the bag, the casing, and the netting must be closed and a clip is the commonly-accepted means for closing food packaging material, whether it is a bag, a net, or a casing. Manual and automated clippers are commercially available. An automated clipper for poultry is described in U.S. Pat. No. 6,883,297 to Kirk et al., which is assigned to the assignee of the present application and the disclosure of which is incorporated by reference. An apparatus for clipping sausages is described in U.S. Pat. No. 7,063,610 to Mysker, which is assigned to the assignee of the present application and the disclosure of which is incorporated by reference.

The clips for a clipper generally are supplied on either a reel or in stick form. Clips can be made of metal or plastic. They are formed in an upside-down U shape, similar to a common office staple. A prior-art metal clip is described in, for example, U.S. Pat. No. 6,401,306 to Hanten et al., which is assigned to the assignee of the present application and the disclosure of which is incorporated by reference.

It is important that the clip keep the netting closed. If a consumer picked up a large item such as a turkey and the netting slipped within the clip, an injury could result, either from the turkey falling out one end of the netting or by the handle pulling tightly about the consumer's fingers. During smoking of hams or sausages, if the netting did not hold tight about the item, the item would not expand through the mesh of the net and would not obtain the dimpled appearance that is considered desirable. Prior art methods to prevent slippage of netting through a clip have not been totally satisfactory. Accordingly, there is a long-felt need, especially within the food packaging industry, for a clip that will securely close netting and prevent slippage of the netting through the clip.

An exemplary prior art clip is illustrated in FIG. 1. The clip 20 consists of a top section 22 joining two legs 24, 26 together. Please note that various configurations of clips exist. The clip 20 shown in FIG. 1 is round-shouldered, but square-shouldered and other configurations exist.

A plurality of clips 20A, 20B, 20C, etc., are joined together as illustrated in FIG. 2 to form a stick or cartridge 30. The clips 20 are held together by a variety of ways, such as glue, tape, plastic guides, or other means, none of which are within the purview of the present invention. The cartridge 30 is inserted in a clipper 32 and moves along a rail 34, as shown in FIG. 3. Additionally, a guide rail 36 on top of the cartridge 30 holds the clips 20 to the rail 34. It is important to maintain the clips 20 on the rail 34. The first clip 20A of a cartridge 30, consisting of clips 20A, 20B, 20C, etc., must be precisely located over a die and under a punch in order to securely fasten the neck of the netting. Maintaining registry of the clips 20 on the rail 34 within the clipper 32 is important to precise control of the clipper 32. Maintaining fast movement of the clips 20 along the rail 34 is also important, especially for high-speed automated manufacturing processes. Accordingly, maintaining registry of the clips and keeping the cartridge moving has been a problem for clipper manufacturers.

To package items in packaging material as described above, whether in bag-type nets, casing, or tubular netting, the netting is gathered into a neck that will fit within the space 38 defined by the legs 24, 26 and the inside face 40 of the top section 22. A punch presses down on the top section 22, forcing the legs 24, 26 into a die which folds the legs 24, 26 inwardly, thereby compressing the formerly open space 38 into compressed space 42 and fastening the neck. A compressed clip 20 is shown in FIG. 4, having legs 24, 26 folded inward.

If enough force is applied to the netting, it will pull through the now-compressed space 42, with undesirable results. One prior art solution to prevent this occurrence is to have the legs 24, 26 fold next to each other, as illustrated in, for example, FIGS. 6b and 8b of the '306 patent cited above. Another technique is to apply a cross-hatch surface pattern to the inside face 38, to increase the friction between the clip 20 and the netting. Neither of these techniques has proven completely satisfactory to ensure adequate fastening of the clip 20 about the neck to keep the item tightly bound within the netting. Additionally, the application of cross-hatching requires another step in the manufacturing process, thereby increasing the cost of the clips, and the increased friction created by the cross-hatching causes difficulties in travel of the clips along the rail of a clipper. Accordingly, there has been a failure by others to solve the problem described above and the long-felt need for a solution still exists.

Accordingly, a need exists for an easily-manufactured clip that that will maintain registry on the rail of a clipper and can be moved at high speed along the rail of a clipper. A need also exists for an easily-manufactured clip that will securely fasten a neck of packaging material and prevent the packaging material from being pulled through the clip. The present invention meets these needs.

BRIEF SUMMARY OF THE INVENTION

Briefly, and in accordance with the foregoing, the present invention in a first embodiment is an article for packaging an item. The article comprises packaging material gathered into a neck and a clip fastening the neck, the clip comprising a top section and two legs connected by the top section, the top section comprising an internal face and an external face, the two legs being folded inward to contact each other, the folded legs and the top section defining a space securing the neck, and the clip further comprising at least one of a shoulder extending from the external face and a pin extending from the internal face into the space. In another embodiment, the invention comprises a plurality of these clips connected by extensions. In another embodiment, the invention further comprises a clipper for using the clips, the clipper having at least one of a notch in the rail of the clipper, a notch in the guide rail of the clipper, and a protrusion in the guide rail of a clipper.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 10 is a side elevation view of a cartridge of clips of another embodiment of the invention.

FIG. 11 is a front view of a single clip of FIG. 10.

FIG. 12 is a top plan view of the clip of FIG. 11.

FIG. 13 is a side elevation view of the clip of FIG. 11.

DETAILED DESCRIPTION OF THE PREFERRED EMBODIMENTS OF THE INVENTION

Figure 1:
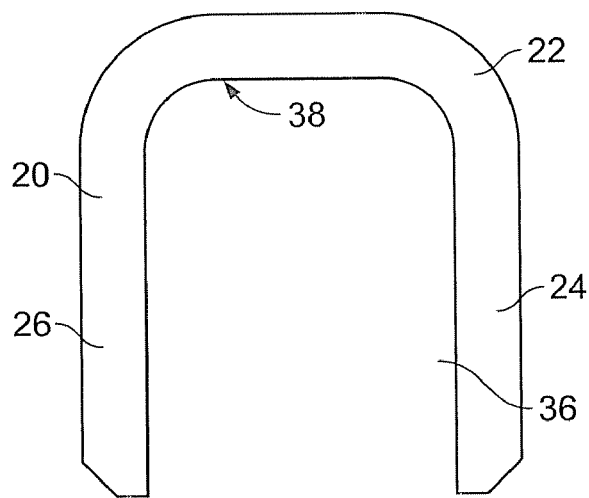
FIG. 1 is a front view of an open clip as known in the prior art.
Figure 2:
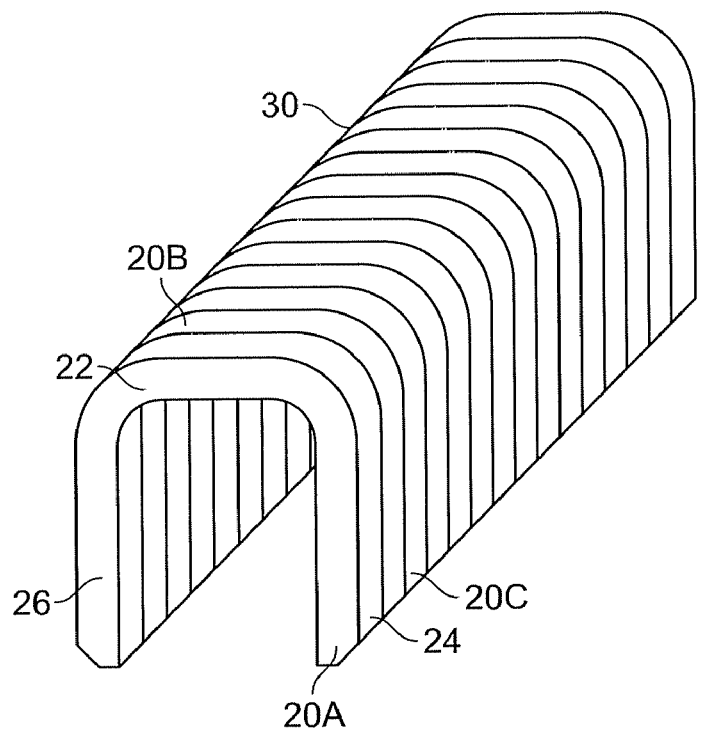
FIG. 2 is a perspective view of a cartridge of clips as known in the prior art.
Figure 3:
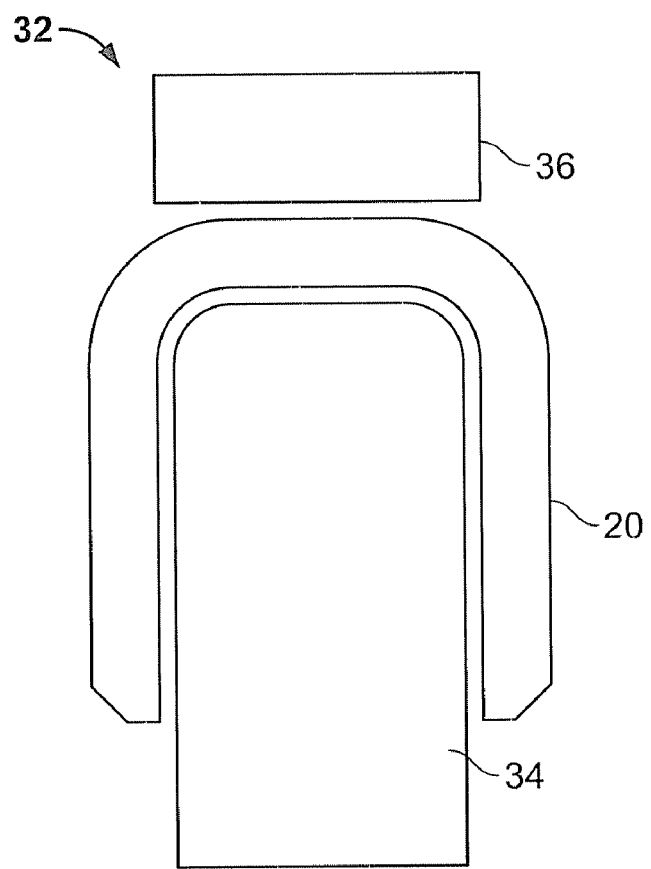
FIG. 3 is a front view of a clip held on a rail by a guide rail of a clipper, as is known in the prior art.
Figure 4:
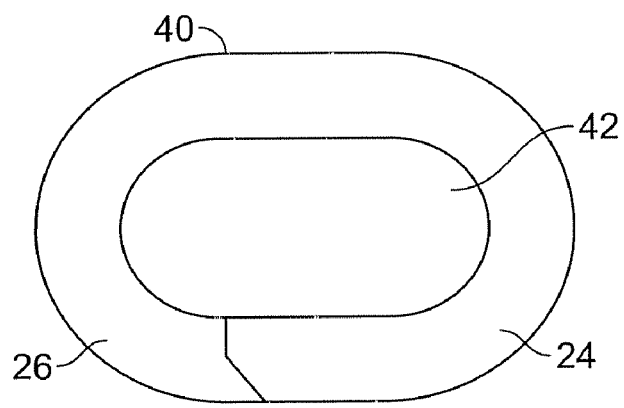
FIG. 4 is a front view of a closed clip as known in the prior art.

While the invention may be susceptible to embodiment in different forms, there is shown in the drawings, and herein will be described in detail, specific embodiments with the understanding that the present disclosure is to be considered an exemplification of the principles of the invention, and is not intended to limit the invention to that as illustrated and described herein.

The clips of the present invention have means for receiving clip control and are designed to be used on a corresponding clipper having clip control means. By using the clips as described herein on a clipper as described herein, the user can improve registry of the clips within the clipper and increase the speed of clipping. Some of the clips of the present invention have the synergistic effect of more effectively securing the packaging material to which the clips are applied. The clip control means as hereinafter described can be a notch in the rail of the clipper, a notch in the guide rail of the clipper, a protrusion in the guide rail of a clipper, or a combination of more than one of these means. The clip control receiving means as hereinafter described can be a shoulder extending from the external face of the top of the clip, a pin extending from the internal face of the top of the clip, or an indentation in the external face of the top of the clip, or a combination of more than one of these means.

Please note that the prior art, while failing to solve the problems described above, has taught away from the solution presented by the present invention. For example, the '306 patent cited above specifically teaches obtaining a circular shape of the closed clip. As can be seen in FIGS. 6a and 8a of that patent, the cross section of the aperture formed by the closed clip is circular in cross section and nothing protrudes into that circle. The present invention, accordingly, presents advantages over the prior art that are not suggested by the prior art.

Figure 5:
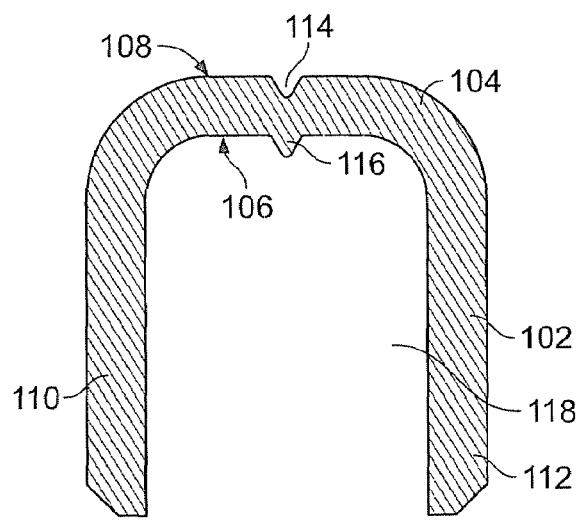
FIG. 5 is a cross-sectional front view of a clip of an embodiment of the present invention.

The clip 102 of one embodiment of the present invention is shown in cross section in FIG. 5. Clip 102, preferably made of a malleable metal, has a top section 104 with an internal face 106 and an external face 108. As illustrated in FIG. 5, top section 104 is generally rounded, but it can be straight and can have sharp corners if desired. Two legs 110, 112 extend from opposite ends of top section 104. Accordingly, legs 110, 112 and top section 104 define an open space 118 within clip 102.

Figure 6:
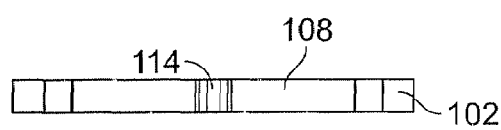
FIG. 6 is a top plan view of a clip of the clip of FIG. 5.

Top section 104 preferably has an indentation 114, as shown in cross section in FIG. 5 and in plan view in FIG. 6. The indentation 114 is provided at generally the midpoint of top section 104, between legs 110, 112, and is preferably approximately V-shaped in cross section. The position of indentation 114 between legs 110, 112 can be closer to one leg or to another, however. Furthermore, while an approximately V-shaped indentation 114 is preferable, as it is easier to manufacture, other shapes can be used, such as hemispherical or hemi-oval, or rectangular, square, or any higher-order polygon.

A pin 116 protrudes from the internal face 106 of top section 104, into space 118. Pin 116 preferably corresponds in location, orientation, and cross-sectional shape to indentation 114. Accordingly, pin 116 is preferably located at generally the midpoint of top section 104, between legs 110, 112, and is approximately V-shaped. The position of pin 116 between legs 110, 112 can be closer to one leg or to another, however, and need not be directly below indentation 114. Furthermore, while an approximately V-shaped pin 116 is preferable, as it is easier to machine, other shapes can be used, such as hemispherical or hemi-oval, or rectangular, square, or any higher-order polygon.

Preferably, both indentation 114 and pin 116 are formed during manufacture by placing clip 102 over an anvil having a groove corresponding to pin 116, and pounding on external face 108 with a hammer having an extrusion corresponding to indentation 114. The hammer will then form indentation 114 in external face 108 and the pressure of the hammer will force the metal of clip 102 into the groove of the anvil, forming pin 116. Other methods of creating indentation 114 and pin 116 will suffice, such as forging techniques, injection molding, or casting, depending on the material of the clip 102, which can be metal, plastic, or other.

A plurality of clips 102 are joined together to form a cartridge of clips 102. Suitable means to join clips 102 to form a cartridge include glue or tape. The cartridge is loaded into a clipper 124 in a conventional manner. Clipper 124 can be any conventional clipper, modified, however, as described herein. Clipper 124 is preferably a manual clipper, such as a Model EZ 4212 sold by Poly-clip System Corp., or a single or double automated clipper, such as a Model TCSA 65 sold by Poly-clip System Corp.

Figure 7:
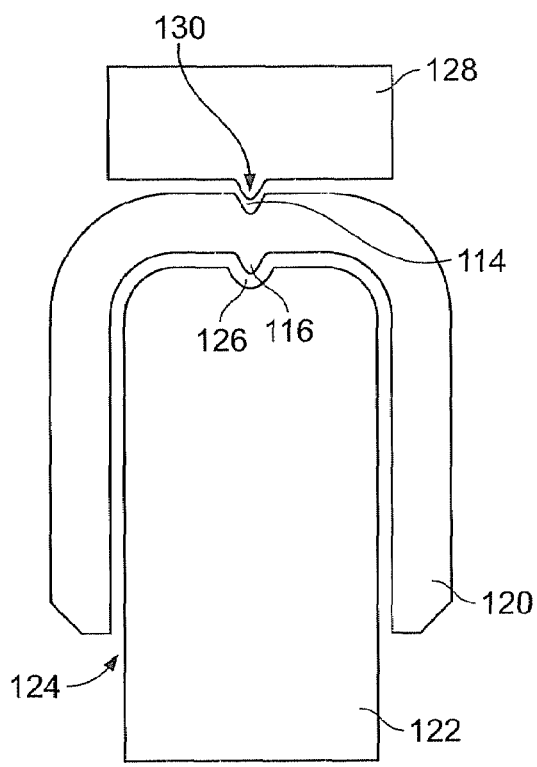
FIG. 7 is a front view of the clip of FIG. 5 held on a rail by a guide rail of a clipper of an embodiment of the present invention.

The rail 122 of clipper 124, however, has a notch 126, as shown in FIG. 7, corresponding in location, orientation, and cross-sectional to pin 116, so that notch 126 mates with pin 116. Accordingly, notch 126 is preferably approximately V-shaped and located in the middle of rail 122. If a different position is used for notch 126, then a corresponding position should be used for pin 116. The shape of pin 116 does not have to exactly match the shape of notch 126, however, so long as pin 116 fits within notch 126.

Similarly, the guide rail 128 of clipper 124 has a corresponding protrusion 130. Accordingly, as clip 102 rides on rail 122, and is held in place on rail 122 by guide rail 128, pin 116 mates with notch 126 and protrusion 130 mates with indentation 114. More precise control of clip 102 is thereby achieved, as clip 102 is constrained from lateral movement.

Figure 8:
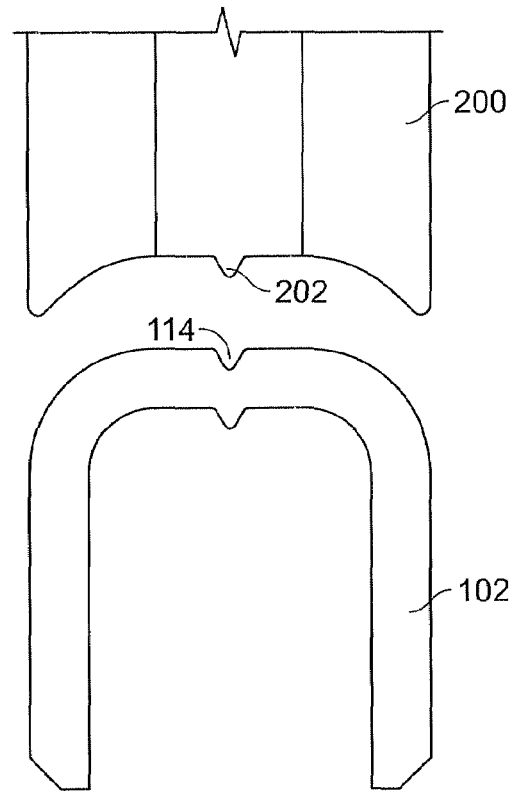
FIG. 8 is a front view of a punch of the clipper of FIG. 7, poised over the clip of FIG. 5.

Clipper 124 has a punch 200 having a shape that corresponds to top surface 108 of clip 102. Accordingly, as shown in FIG. 8, punch 200 has a punch pin 202 that preferably corresponds in location, orientation, and cross-sectional shape to indentation 114, so that pin 202 mates with indentation 114.

Figure 9:
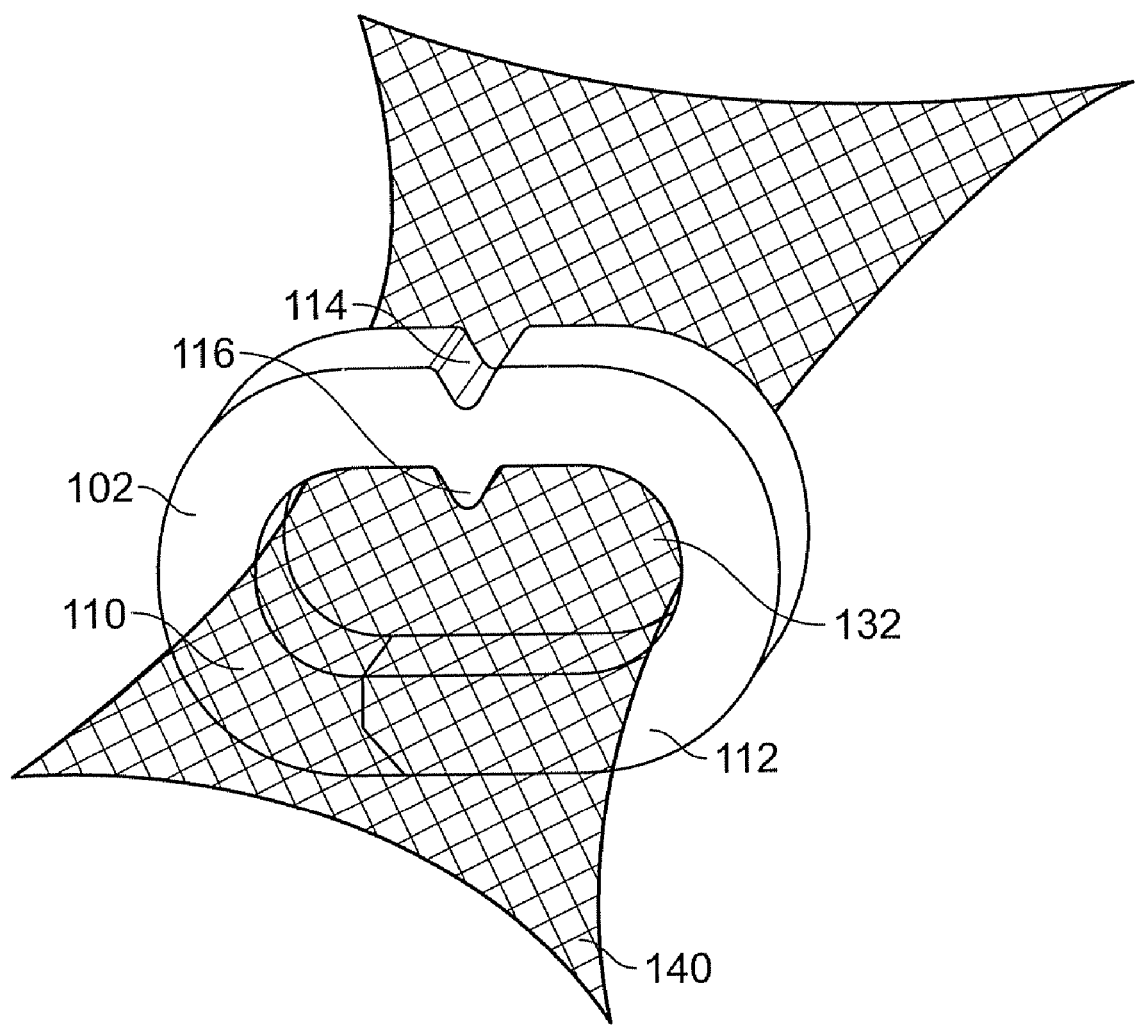
FIG. 9 is a perspective view of the clip of FIG. 5, having been closed by the clipper of FIG. 7 about a neck of packaging material.

When punch 200 closes clip 102 over packaging material 140, as shown in FIG. 9, clip 102 creates annular space 132, by virtue of legs 110, 112 being folded against each other to form a closed loop. Pin 116, however, projects into annular space 132 and therefore into the packaging material 140 gathered therein. Should a great amount of force be applied to the packaging material 140 captured within annular space 132 (such as a consumer picking up a whole, frozen turkey by a handle formed in the netting), pin 116 vastly decreases the likelihood that the packaging material 140 can be pulled out of annular space 132. The packaging material 140 is therefore fastened much more securely.

Please note that, while FIG. 9 illustrates netting used as packaging material 140, clip 102 will work equally well with solid bags or tubular casings. For example, material can be encased in a solid plastic bag, and the neck of the bag can be gathered and then clipped. Pin 116, projecting into annular space 132, and therefore into the packaging material 140 gathered therein, will prevent the plastic from slipping through annular space 132 and releasing the contents of the bag.

Another embodiment will now be described. A stick or cartridge 300 of clips 302 is shown in side elevation view in FIG. 10. An individual clip 302 of this embodiment of the invention is shown in elevation view FIG. 11, in top plan view in FIG. 12, and in side elevation view in FIG. 13. Stick 300 is preferably fifty clips 302A, 302B, 302C, etc., preferably made of an injection-molded plastic, and preferably injection molded in one piece, although only three clips 302 are shown in stick 300 in FIG. 10 for ease of illustration. Different numbers of clips 302 in stick 300, or formation of clips 302 into a reel, is possible. Clips 302A, 302B, 302C, etc., could also be made of metal or another material.

Clip 302 has a top section 304 with an internal face 306 and an external face 308. As illustrated in FIG. 11, top section 304 is generally rounded, but it can be straight and can have sharp corners if desired. Two legs 310, 312 extend from opposite ends of top section 304. Accordingly, legs 310, 312 and top section 304 define a space 314 within clip 302.

Each leg 310, 312 terminates, at an end opposite top section 304, in a foot section 316. Each foot section 316 has a protrusion 318 extending into space 314. Legs 310, 312 preferably are narrower in front cross-section, as shown in FIG. 11, at an end having protrusion 318, than at an end meeting top section 304. Preferably, outer edge 320 of leg 310 is parallel to outer edge 322 of leg 312, so that the narrowing of each leg 310, 312 occurs from sloping of inner edge 324 of leg 310 and inner edge 326 of leg 312, relative to outer edges 320, 322, respectively.

Top section 304 has a shoulder 328. Shoulder 328 is provided at generally the midpoint of top section 304, between legs 310, 312, and is preferably rounded at the top in cross section. The position of shoulder 328 between legs 310, 312 can be closer to one leg or to another, however. Furthermore, while a rounded shoulder 328 is preferable, as it is easier to manufacture, other shapes can be used, such as hemispherical or hemi-oval, or rectangular, square, or any higher-order polygon.

Each clip 302 is preferably approximately 200 millimeters deep. Each clip 302 is separated from adjacent clips 302 in stick 300 by approximately 50 millimeters. Shoulder 328 has a connecting portion 330 that extends laterally across top section 304 of each clip 302, so that each clip 302 is connected to form a one-piece stick 300. In use, the connecting portions 330 of shoulder 328 will easily snap, allowing an individual clip 302 to be removed from stick 300. Connecting portions 330 could extend from a different portion of clip 302 than shoulder 328.

Stick 300 is loaded into a clipper 400 in a conventional manner. Clipper 400 can be any conventional clipper, modified, however, as described herein. Clipper 400 is preferably a manual clipper, such as a Model EZ 4212 sold by Poly-clip System Corp., or a single or double automated clipper, such as a Model TCSA 65 sold by Poly-clip System Corp.

Figure 14:
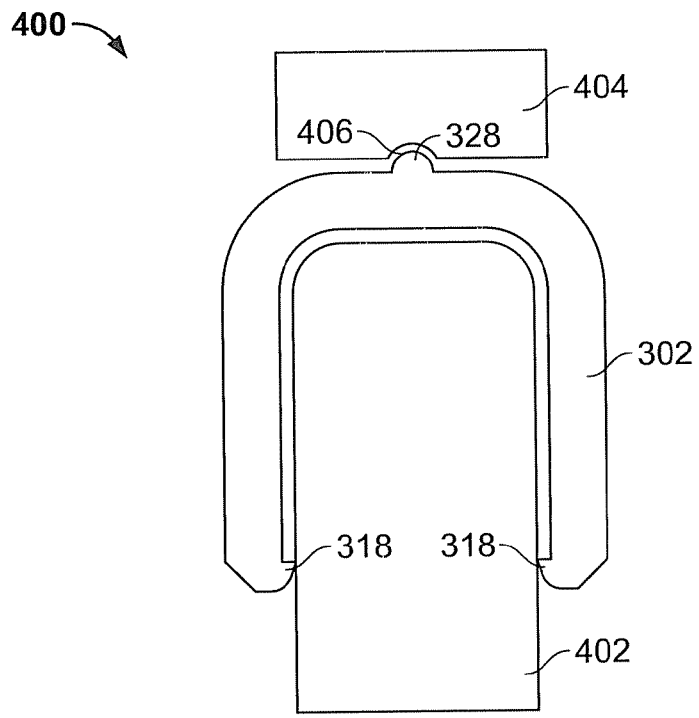
FIG. 14 is a front view of the clip of FIG. 10 held on a rail by a guide rail of a clipper of an embodiment of the present invention.

Clips 302, whether provided in the form of stick 300 or in a reel, ride on rail 402 in clipper 400 and are guided thereon by rail guide 404. Rail 402, as shown in FIG. 14, has a cross-sectional shape corresponding to the shape of interior space 314 of clip 302, allowing clips 302 of stick 300 to slide on rail 402. Additionally, rail guide 404 has a cross-sectional shape corresponding to the top section 304 of clip 302, including the cross-sectional shape of shoulder 328. Indentation 406 in rail guide 404 corresponds in location, orientation, and cross-sectional shape to shoulder 328, so that indentation 406 mates with shoulder 328. Accordingly, clipper 400 thereby holds clips 302 securely.

Figure 15:
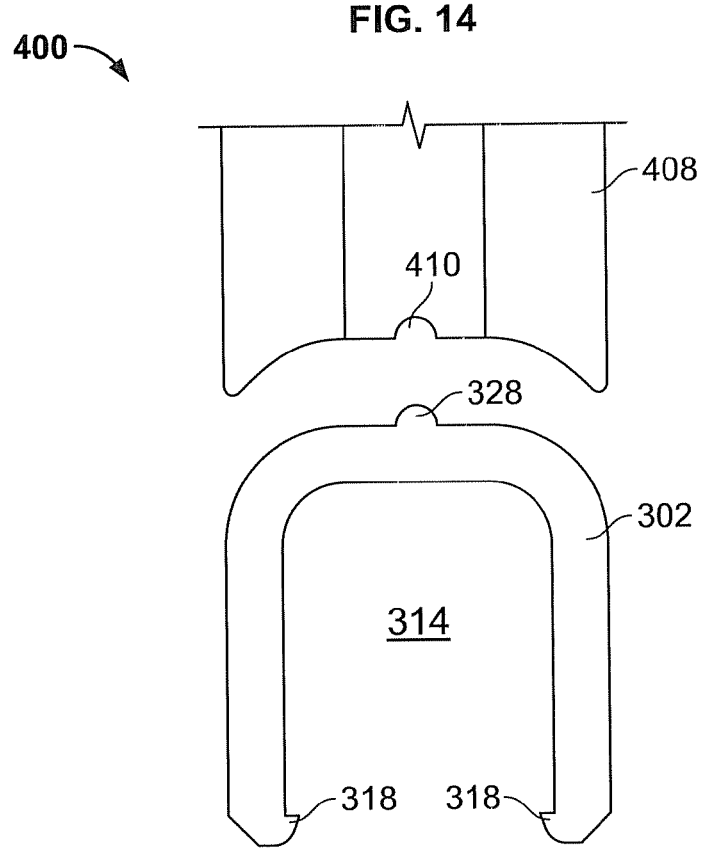
FIG. 15 is a front view of a punch of the clipper of FIG. 14, poised over the clip of FIG. 10.
Figure 16:
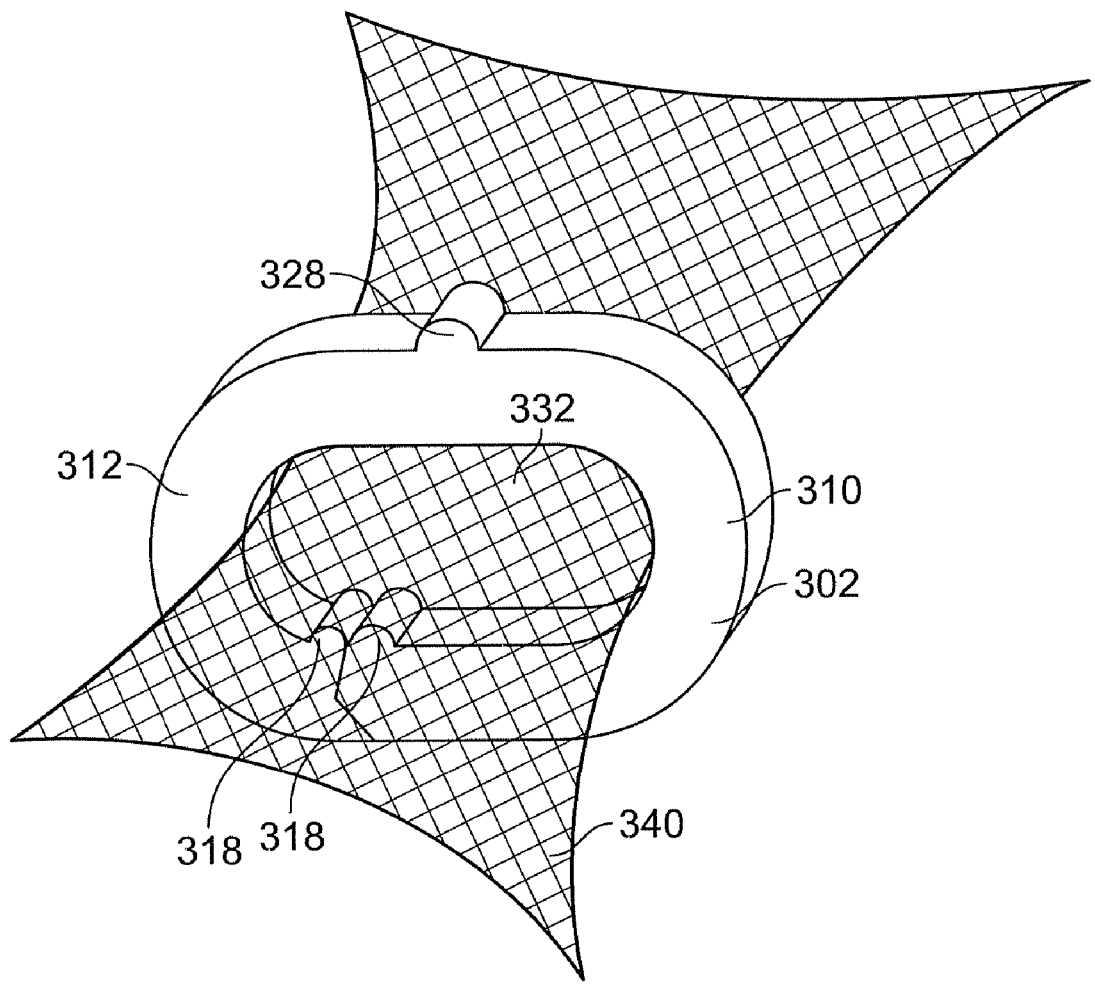
FIG. 16 is a perspective view of the clip of FIG. 10, having been closed by the clipper of FIG. 14 about a neck of packaging material.

The clips 302 of stick 300 are fed to the die area of clipper 400, under punch 408, as shown in FIG. 15. The first clip 302A in a stick 300 (or the first clip 302A in a reel) is oriented under punch 408 and over the die in a conventional manner, and the neck of the packaging material 340 is arranged within space 314. Punch 408 strikes top portion 304 of clip 302, forcing legs 310, 312 into the die in a conventional manner, and causing legs 310, 312 to bend inward, sealing the neck of the packaging material. Clipper 400 can cause legs 310, 312 to bend inward in a V-shape, or "wrap around" configuration, or to bend inward in a W-shape, or "butt to butt" configuration, as is known in the art, depending on the preference of the user and the type of packaging being sealed. FIG. 16 shows packaging material 340 clipped in clip 302 in a "butt to butt" configuration.

The punch 408 of clipper 400 has a concave, arcuate shape corresponding to the convex, rounded top portion 304 of clip 302. Punch 408 also has an indentation 410, having a cross-sectional shape corresponding in location, orientation, and cross-sectional shape to the cross-sectional shape of shoulder 328, as shown in FIG. 6, so that, on the punch stroke of clipper 400, indentation 410 mates with shoulder 328. Each individual clip 302 is thereby controlled well within the die area of clipper 400, as clip 302 is constrained from lateral movement during the clipping operation. A slight misalignment of an individual clip 302 within the die area of clipper 400 is automatically corrected by punch 408, as shoulder 328 will self-align into indentation 410, thereby providing superior performance. Clipper 400 thereby provides superior control of clip 302 within the die area, resulting in more accurate clipping of packaging material.

Because clips 302 are preferably made of plastic, legs 310, 312 will bend inward easily to seal the packaging material. Because of the tapering shape of legs 310, 312, wherein legs 310, 312 are thicker in the area that bends, the plastic will deform to close legs 310, 312, rather than breaking. Other materials are possible.

When punch 408 closes clip 302 over packaging material, the closure of legs 310, 312 closes space 314, converting space 314 into an annular space 332, as shown in FIG. 16. Protrusions 318 will then project into that annular space 332. Should a great amount of force be applied to the packaging material captured within this annular space 332 (such as a consumer picking up a whole, frozen turkey by a handle formed in the netting), protrusions 318 will tend to keep the packaging material from pulling through this annular space 332 and releasing the contents of the packaging material.

Additionally, protrusions 318 will extend into the packaging material, further sealing the contents, as protrusions 318 will tend to keep the packaging material from pulling out.

Figure 17:
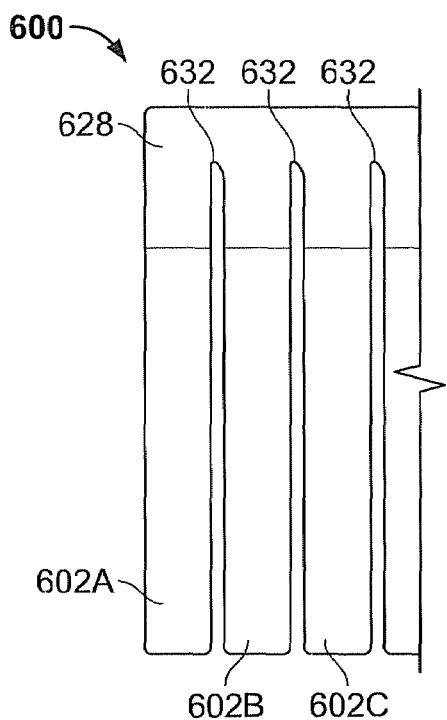
FIG. 17 is a side elevation view of a cartridge of clips of another embodiment of the invention.
Figure 18:
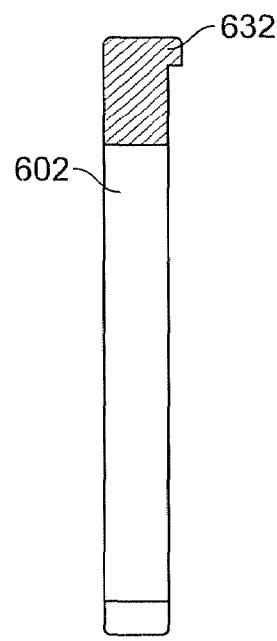
FIG. 18 is a side elevation view of a single clip of FIG. 17.
Figure 19:
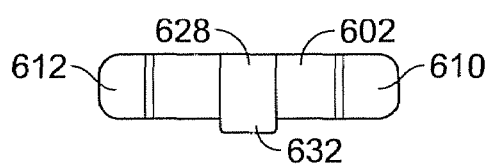
FIG. 19 is a top plan view of the clip of FIG. 18.

Yet another embodiment will now be described. A stick or cartridge 600 of clips 602 is shown in side elevation view in FIG. 17. An individual clip 602 of the preferred embodiment of the present invention is shown in elevation view FIG. 18, in top plan view in FIG. 19, and in side elevation view in FIG. 20. Stick 600 is preferably fifty clips 602A, 602B, 602C, etc., preferably made of an injection-molded plastic, and preferably injection molded in one piece, as will hereinafter be described although only three clips 602 are shown in stick 600 in FIG. 20 for ease of illustration. Different numbers of clips 602 in stick 600, or formation of clips 602 into a reel, is possible. Clips 602A, 602B, 602C, etc., could also be made of metal or another material.

Figure 20:
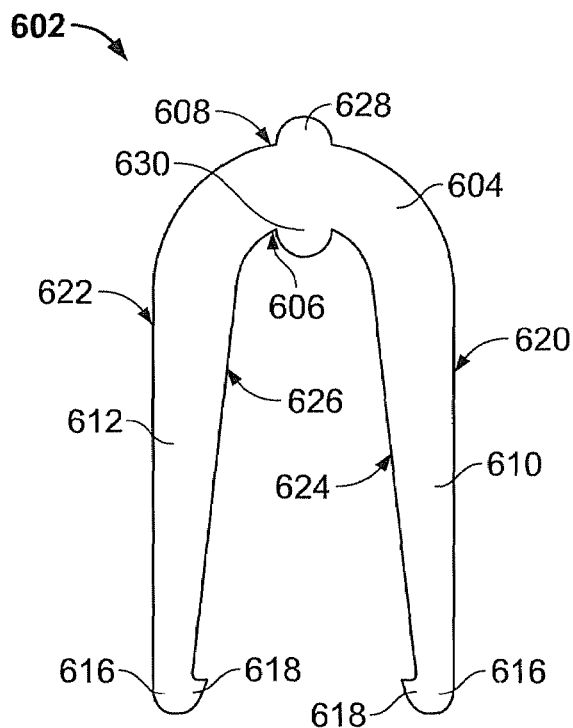
FIG. 20 is a front view of the clip of FIG. 18.

Clip 602 has a top section 604 with an internal face 606 and an external face 608. As illustrated in FIG. 20, top section 604 is generally rounded, but it can be straight and can have sharp corners if desired. Two legs 610, 612 extend from opposite ends of top section 604. Accordingly, legs 610, 612 and top section 604 define a space 614 within clip 602.

Each leg 610, 612 terminates, at an end opposite top section 604, in a foot section 616. Each foot section 616 has a protrusion 618 extending into space 614. Legs 610, 612 preferably are narrower in front cross-section, as shown in FIG. 20, at an end having protrusion 618, than at an end meeting top section 604. Preferably, outer edge 620 of leg 610 is parallel to outer edge 622 of leg 612, so that the narrowing of each leg 610, 612 occurs from sloping of inner edge 624 of leg 610 and inner edge 626 of leg 612, relative to outer edges 620, 622, respectively.

Top section 604 has a shoulder 628. Shoulder 628 is provided at generally the midpoint of top section 604, between legs 610, 612, and is preferably rounded at the top in cross section. The position of shoulder 628 between legs 610, 612 can be closer to one leg or to another, however. Furthermore, while a rounded shoulder 628 is preferable, as it is easier to manufacture, other shapes can be used, such as hemispherical or hemi-oval, or rectangular, square, or any higher-order polygon.

Pin 616 protrudes from the internal face 606 of top section 604, into space 614. Pin 616 is preferably located at generally the midpoint of top section 604, between legs 610, 612, and is rounded. The position of pin 616 between legs 610, 612 can be closer to one leg or to another, however. Furthermore, while a rounded pin 616 is preferable, as it is easier to mold, other shapes can be used, such as approximately V-shaped, hemispherical, hemi-oval, rectangular, square, or any higher-order polygon.

Each clip 602 is preferably approximately 200 millimeters deep. Each clip 602 is separated from adjacent clips 602 in stick 600 by approximately 50 millimeters. Shoulder 628 extends laterally across top section 604 of each clip 602, so that each clip 602 is connected to form a one-piece stick 600. In use, the connecting portions 632 of shoulder 628 will easily snap, allowing an individual clip 602 to be removed from stick 600. Please note that connecting portions 632 can be formed from lateral extensions of other parts of clip 602.

Stick 600 is loaded into a clipper 700 in a conventional manner. Clipper 700 can be any conventional clipper, modified, however, as described herein. Clipper 700 is preferably a manual clipper, such as a Model EZ 4212 sold by Poly-clip System Corp., or a single or double automated clipper, such as a Model TCSA 65 sold by Poly-clip System Corp.

Figure 21:
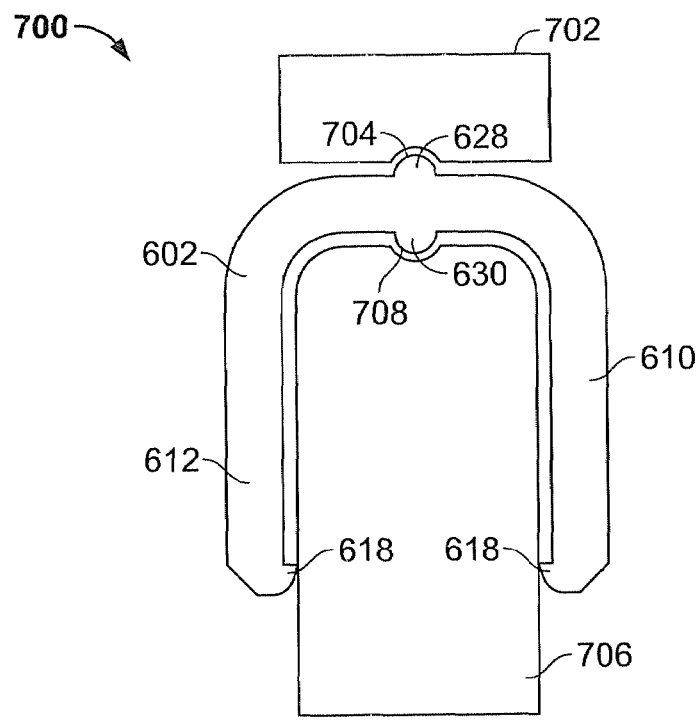
FIG. 21 is a front view of the clip of FIG. 18 held on a rail by a guide rail of a clipper of an embodiment of the present invention.
Figure 22:
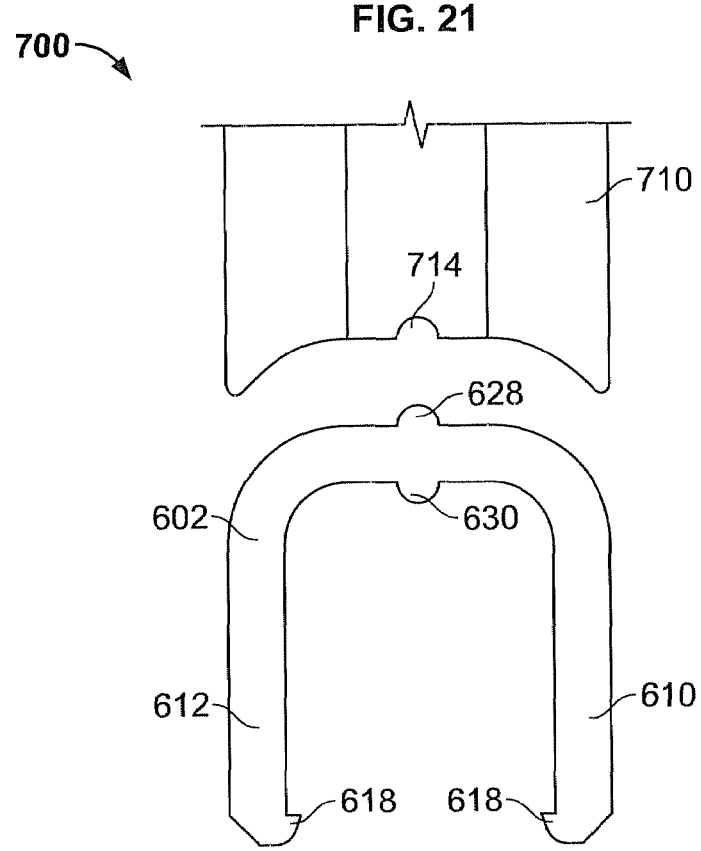
FIG. 22 is a front view of a punch of the clipper of FIG. 21, poised over the clip of FIG. 18.
Figure 24:
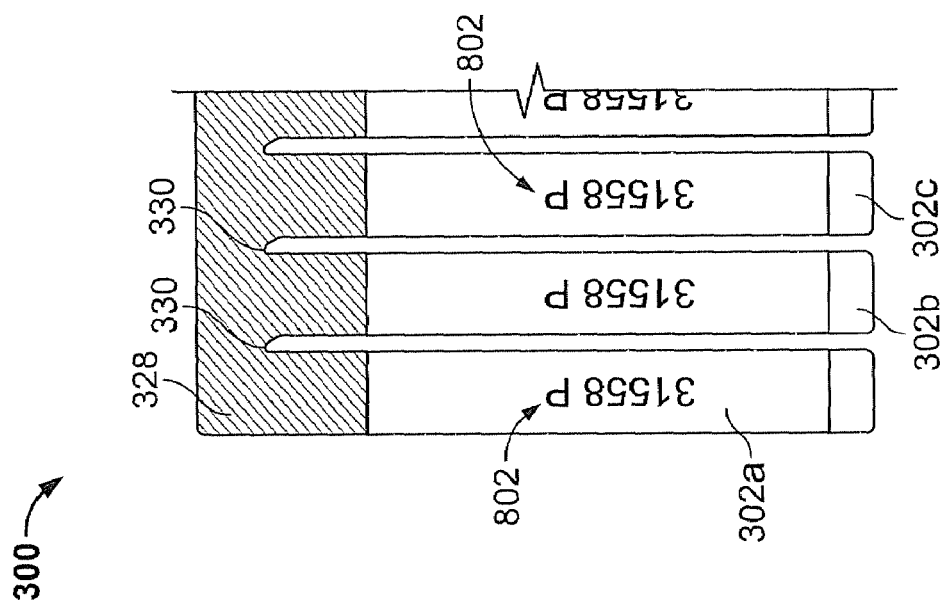
FIG. 24 is a side elevation view of identifying information on the clips of the cartridge of FIG. 10.

The guide rail 702 of clipper 700 has an indentation 704, corresponding in location, orientation, and cross-sectional shape to shoulder 628, so that indentation 704 mates with shoulder 628. The rail 706 of clipper 700 has an indentation 708, corresponding in location, orientation, and cross-sectional shape to pin 630, so that indentation 704 mates with shoulder 628. Accordingly, clips 602, whether provided in the form of stick 600 or in a reel, ride on rail 706 of clipper 700 and are guided thereon by rail guide 702. Rail 706 as shown in FIG. 21, has a cross-sectional shape corresponding to the shape of interior space 614 of clip 602, allowing clips 602 of stick 600 to slide on rail 702. Additionally, rail guide 702 has a cross-sectional shape corresponding to the top 604 of clip 602, including the cross-sectional shape of shoulder 628. Clipper 700 thereby holds clips 602 securely.

Figure 23:
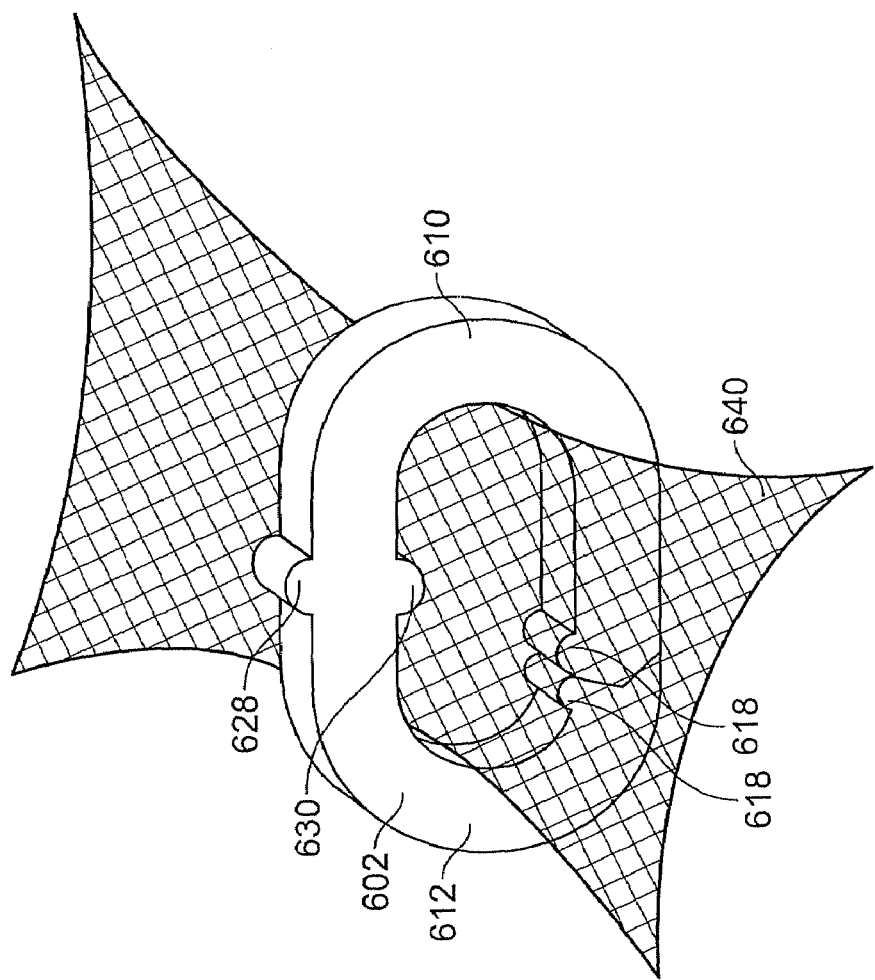
FIG. 23 is a perspective view of the clip of FIG. 18, having been closed by the clipper of FIG. 21 about a neck of packaging material.

The clips 602 of stick 600 are fed to the die area of clipper 700, between punch 710 and the die of clipper 700. The first clip 602A in a stick 600 (or the first clip 602A in a reel) is oriented under punch 710 and over the die, and the neck of the packaging material 640 is arranged within space 614. Punch 710 strikes top section 604 of clip 602, forcing legs 610, 612 into die 712 in a conventional manner, and causing legs 610, 612 to bend inward, sealing the neck of packaging material 640. Die 712 can cause legs 610, 612 to bend inward in a V-shape, or "wrap around" configuration, or to bend inward in a W-shape, or "butt to butt" configuration, as is known in the art, depending on the preference of the user and the type of packaging being sealed. FIG. 23 shows packaging material 640 clipped in clip 602 in a "butt to butt" configuration.

Punch 710 of clipper 700 has a concave, arcuate shape corresponding to the convex, rounded top portion 604 of clip 602. Punch 710 also has an indentation 714, having a cross-sectional shape corresponding to the cross-sectional shape of shoulder 628, as shown in FIG. 6, so that indentation 714 mates with shoulder 628. Each individual clip 602 is thereby controlled well within the die area of clipper 700, as clip 602 is constrained from lateral movement during the clipping operation. A slight misalignment of an individual clip 602 within the die area of clipper 700 is automatically corrected by punch 710, as shoulder 628 will self-align into indentation 714, thereby providing superior performance. Clipper 700 thereby provides superior control of clip 602 within the die area, resulting in more accurate clipping of packaging material.

Because clips 602 are made of plastic, legs 610, 612 will bend inward easily to seal the packaging material. Because of the tapering shape of legs 610, 612, wherein legs 610, 612 are thicker in the area that bends, the plastic will deform to close legs 610, 612, rather than breaking. Other materials are possible.

When punch 710 closes clip 602 over packaging material, the closure of legs 610, 612 closes space 614, converting space 614 into an annular configuration, as shown in FIG. 23. Protrusion 618 will then project into that annular space 614. Should a great amount of force be applied to the packaging material captured within this annular space 614 (such as a consumer picking up a whole, frozen turkey by a handle formed in the netting), protrusion 618 will tend to keep the packaging material from pulling through this annular space 614 and releasing the contents of the packaging material. Additionally, when clip 602 is closed around packaging material, protrusions 618 will extend into the packaging material, further sealing the contents, as protrusions 618 will tend to keep the packaging material from pulling out.

In another embodiment, identification information 802 is supplied. Both poultry products and meat products in the United States must be labeled with the official establishment number of the establishment where the poultry or meat article was processed. This embodiment will be described in connection with the packaging of poultry products, but similar considerations apply to the packaging of meat products. The identification information 802 as discussed herein can apply to non-food products as well. Furthermore, identification information 802 will be described as applied to clip 302, but identification information 802 can be used on other clips as described herein.

In the embodiment described in FIG. 10, the outer edges 320, 322 of clip 100 are flat surfaces. During the manufacturing process, identification information 802 is supplied on at least one of outer edges 320, 322 of each clip 302. Identification information 802 is preferably the official establishment number of the establishment where the poultry will be processed. Identification information 802 can be a plant number, stock number, customer number, or any other information that the clip user desires to have on its clips 302.

Identification information 802 can be supplied on one of outer edges 320, 322 by imprinting that information with a laser, by forming that information in the plastic injection molding process, by applying that information with a printer, such as an ink jet printer, or by burning that information into the surface. Identification information 802 as illustrated is a combination of Arabic letters and numerals, to show an official establishment number, but identification information 802 can also be words, a bar code, a digital code, other symbols, or any other means of conveying information.

Clips 102, 302, 602 as described herein can be used to enclose any type of material in a bag, in a tubular package, in a net, either bag-type or tubular, in a casing, either tubular or roll-stock, or in any other application in which packaging material must be closed. A label may also be placed at the neck of the packaging material, so that the label is clipped to the package, such as a label containing information as to the provenance, weight, lot number, or expiration date of the packaged material, as described in, for example, the '297 patent referenced above. Clips 102, 302, 602 as described herein can also be used to attach together two planar pieces of material to each other, where control of the clip 102, 302, 602 within the clipper and within the die area is desired.

While a preferred embodiment of the present invention is shown and described, it is envisioned that those skilled in the art may devise various modifications of the present invention without departing from the spirit and scope of the appended claims.

We claim:

1. An apparatus for packaging an item, comprising:
   a clip comprising a top section and two legs connected by said top section, said top section comprising an internal face and an external face, said two legs being foldable inward to contact each other, said legs and said top section defining a space containing said neck, and said clip further comprising a shoulder extending from said external face and a pin extending from said internal face into said space;
   a clipper comprising a notch in a rail of said clipper and a notch in a guide rail of said clipper.

2. The apparatus of claim 1, wherein said clipper further comprises a punch, said punch having a notch mating to said shoulder.

3. The apparatus of claim 1, wherein said clip further comprises identification information.

4. The apparatus of claim 3, wherein said identification information comprises at least one of a word, a bar code, a digital code, and a symbol.

* * * * *

UNITED STATES PATENT AND TRADEMARK OFFICE
CERTIFICATE OF CORRECTION

| | | |
|---|---|---|
| PATENT NO. | : 7,565,780 B2 | Page 1 of 1 |
| APPLICATION NO. | : 11/734381 | |
| DATED | : July 28, 2009 | |
| INVENTOR(S) | : Robert Pinto et al. | |

It is certified that error appears in the above-identified patent and that said Letters Patent is hereby corrected as shown below:

<u>Column 1, Line 17</u>

"such as ill netting," should be

-- such as in netting, --

Signed and Sealed this

First Day of December, 2009

David J. Kappos
*Director of the United States Patent and Trademark Office*